United States Patent
Lee et al.

(10) Patent No.: US 9,606,399 B2
(45) Date of Patent: Mar. 28, 2017

(54) MEMBER FOR CONTROLLING LUMINOUS FLUX AND DISPLAY DEVICE HAVING THE SAME

(71) Applicant: LG INNOTEK CO., LTD., Seoul (KR)

(72) Inventors: Chang Hyuck Lee, Seoul (KR); Eun Sung Seo, Seoul (KR); Ki Cheol Kim, Seoul (KR); Hyun Ho Choi, Seoul (KR); Gi Seok Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/390,524

(22) PCT Filed: Dec. 14, 2012

(86) PCT No.: PCT/KR2012/010932
§ 371 (c)(1),
(2) Date: Oct. 3, 2014

(87) PCT Pub. No.: WO2013/151224
PCT Pub. Date: Oct. 10, 2013

(65) Prior Publication Data
US 2015/0098211 A1    Apr. 9, 2015

(30) Foreign Application Priority Data
Apr. 5, 2012 (KR) .................. 10-2012-0035669

(51) Int. Cl.
*G02F 1/1335* (2006.01)
*G02B 19/00* (2006.01)
*F21K 9/90* (2016.01)

(52) U.S. Cl.
CPC .......... *G02F 1/133611* (2013.01); *F21K 9/90* (2013.01); *G02B 19/0028* (2013.01);
(Continued)

(58) Field of Classification Search
CPC ..... F21V 5/00; F21V 5/04; F21V 5/46; F21V 5/08; F21V 13/04; F21V 5/046;
(Continued)

(56) References Cited

U.S. PATENT DOCUMENTS 7,348,723 B2 *  3/2008  Yamaguchi et al. .......... 313/501
7,352,011 B2 *  4/2008  Smits et al. .................... 257/99
(Continued)

FOREIGN PATENT DOCUMENTS

CN        101097356 A      1/2008
CN        101504123 A      8/2009
(Continued)

OTHER PUBLICATIONS

International Search Report dated Mar. 15, 2013 issued in Application No. PCT/KR2012/010932.
(Continued)

*Primary Examiner* — Hargobind S Sawhney
(74) *Attorney, Agent, or Firm* — Ked & Associates, LLP (57) ABSTRACT

The exemplary embodiments of the present invention have a first refractive surface whose distance from a central axis gradually increasing as being distanced from a rear surface, and light from a light source can be effectively emitted from a first refractive surface to a lateral direction or an upper lateral direction.

15 Claims, 6 Drawing Sheets

(52) U.S. Cl.
CPC ... *G02B 19/0061* (2013.01); *G02F 1/133603* (2013.01); *G02B 19/0014* (2013.01); *Y10T 29/49117* (2015.01)

(58) Field of Classification Search
CPC .......... G02B 3/04; G02B 3/02; G02B 3/0093; G02B 19/0014; G02B 19/0028; G02F 1/13357; G02F 1/1335; G02F 1/133602; G02F 1/133603; G02F 1/133607; H01L 33/00; F21Y 101/02; F21K 9/90
USPC .... 362/97.1–97.4, 235, 244, 249.01, 249.02, 362/296.01, 305, 307, 311.01, 311.06, 362/326, 327, 329, 335
See application file for complete search history.

(56) References Cited

U.S. PATENT DOCUMENTS

| | | | |
|---|---|---|---|
| 7,474,475 B2* | 1/2009 | Paek et al. | 359/726 |
| 7,909,846 B1 | 3/2011 | Taylor et al. | 606/198 |
| 7,922,370 B2 | 4/2011 | Zhang et al. | |
| 8,075,157 B2* | 12/2011 | Zhang et al. | 362/249.02 |
| 8,469,554 B2* | 6/2013 | Kimura et al. | 362/335 |
| 8,585,239 B1* | 11/2013 | Tseng | 362/244 |
| 2007/0217195 A1 | 9/2007 | Chen et al. | |
| 2010/0201911 A1 | 8/2010 | Iiyama et al. | 349/61 |
| 2010/0208453 A1 | 8/2010 | Kimura et al. | |
| 2011/0007513 A1 | 1/2011 | Zhang et al. | |

FOREIGN PATENT DOCUMENTS

| | | |
|---|---|---|
| CN | 101639181 A | 2/2010 |
| EP | 1860467 A1 | 11/2007 |
| JP | 2011-003461 A | 1/2011 |
| TW | 200643339 A | 12/2006 |
| WO | WO 2006-103582 A1 | 10/2006 |
| WO | WO 2008/017718 A1 | 2/2008 |

OTHER PUBLICATIONS

Taiwanese Office Action dated Dec. 19, 2014 issued in Application No. 101149268 (Original Office Action and English Translation).
European Search Report dated Oct. 23, 2015 issued in Application No. 12873744.2.

* cited by examiner

MEMBER FOR CONTROLLING LUMINOUS FLUX AND DISPLAY DEVICE HAVING THE SAME

CROSS-REFERENCE TO RELATED PATENT APPLICATIONS

This application is a U.S. National Stage Application under 35 U.S.C. §371 of PCT Application No. PCT/KR2012/010932, filed Dec. 14, 2012, which claims priority to Korean Patent Application No. 10-2012-0035669, filed Apr. 5, 2012, whose entire disclosures are hereby incorporated by reference.

TECHNICAL FIELD

The teachings in accordance with exemplary and non-limiting embodiments of this invention relate generally to a member for controlling luminous flux and a display device having the same.

BACKGROUND ART

Generally, due to the characteristics of light weight, slim thickness, low electric power consumption, the liquid crystal display device (or, LCD) is being widely applied. Concomitant with this wide application, the LCD is used for office automation devices and audio/video devices. The LCD displays a picture data (or an image) by using the physical property of crystal that changes array in response to voltage or temperature. That is, in general, the liquid crystal display device (LCD) displays a picture by making each of liquid crystal cells in a matrix of liquid crystal cells at a liquid crystal display panel to control light transmissivity according to a video signal.

As the LCD is not a self-luminescent element, the LCD requires, at a rear surface of the liquid crystal display panel, a backlight unit for irradiating light to the liquid crystal display panel for displaying an image. That is, liquid crystal display (LCD) panels, which are mounted to display devices or the like, do not have a self-luminous function. For this reason, a backlight unit (BLU) is disposed at the rear of such an LCD panel, to generate light and to provide the generated light to the LCD panel.

Generally, an LCD includes an array substrate, a color filter substrate, a layer of liquid crystal panel provided between the array substrate and the color filter substrate, and a backlight unit emitting light to the liquid crystal panel.

There are two kinds of the backlight units for LCD, one is the direct type backlight unit and the other is the edge type backlight unit. The edge type backlight unit includes a light guide panel and light emitting diodes. The light emitting diodes are arranged at a lateral surface of the light guide panel. The light guide panel guides the light emitted from the light emitting diodes through a total reflection, and emits the light to the liquid crystal panel.

On the other hands, for the direct type backlight unit, no light guide panel is used and light emitting diodes are arranged at a rear surface of the light guide panel, whereby the light emitting diodes emit light toward the rear surface of the liquid crystal panel.

The backlight unit must uniformly emit light to the liquid crystal panel. That is, efforts are being waged to improve brightness uniformity of the liquid crystal display device.

DISCLOSURE

Technical Problem

Accordingly, the present invention has been made keeping in mind the above disadvantages problems occurring in the prior art, and an object of the present invention is to provide a member for controlling luminous flux and a display device having the same, configured to improve brightness uniformity.

Technical Solution

In order to accomplish the above object, the present invention provides a member for controlling luminous flux (hereinafter referred to as "luminous flux control member"), the member comprising: an incident surface where light is incident on; a refractive surface where the light is emitted from the incident surface; and a rear surface extended from the incident surface to the refractive surface, where a central axis is defined by an axis extended from a center of the incident surface to a center of the refractive surface, and wherein the refractive surface includes a first refractive surface extended from the rear surface, where a distance from the central axis is gradually increased as the first refractive surface recedes from the rear surface.

Preferably, but not necessarily, the refractive surface may include a second refractive surface that is curved and extended from the first refractive surface, where a distance from the central axis is gradually increased as the second refractive surface recedes from the rear surface.

Preferably, but not necessarily, the refractive surface may be formed with a recess surface opposite to the incident surface, and the second refractive surface may be extended from the first refractive surface to an outside of the recess surface.

Preferably, but not necessarily, the recess surface may reflect light to any one direction of a lateral direction, an upper lateral direction and a bottom lateral direction.

Preferably, but not necessarily, the second refractive surface may refract the light reflected from the recess surface to any one direction of a lateral direction, an upper lateral direction and a bottom lateral direction.

Preferably, but not necessarily, a second straight line may be defined by a line extended from a center of the incident surface to an area where the second refractive surface and the recess surface join, and an angle between the central axis and the second straight line is 5°~25°.

Preferably, but not necessarily, a first straight line may be defined by a line extended from a center of the incident surface to an area where the first refractive surface and the second refractive surface join, and an angle between the central axis and the first straight line is 30°~85°.

Preferably, but not necessarily, an angle between the first refractive surface and the rear surface may be 110°~175°.

Preferably, but not necessarily, the luminous flux control member may include a silicon resin.

In another general aspect of the present invention, there is provided a display device, the display device comprising: a driving substrate; a light source connected to the driving substrate; a luminous flux control member incident with light from the light source; and a display panel incident with the light from the luminous flux control member, wherein the luminous flux control member includes an incident surface where light is incident on from the light source, and a refractive surface where the light is emitted from the incident surface, wherein the refractive surface includes a first refractive surface where a distance from an axis of the light source is gradually increased as the first refractive surface recedes from a driving substrate.

Preferably, but not necessarily, the luminous flux control member may further include a rear surface extended from the incident surface and being opposite to the driving substrate, wherein the first refractive surface is extended from the rear surface.

Preferably, but not necessarily, the first refractive surface may be such that a distance from an optical axis of the light source is gradually increased as the first refractive surface recedes from the rear surface.

Preferably, but not necessarily, the luminous flux control member may be directly brought into tight contact with the light source and the driving substrate.

Preferably, but not necessarily, the refractive surface may include a second refractive surface where a distance from the axis of the light source is gradually decreased as the second refractive surface recedes from the driving substrate.

Preferably, but not necessarily, the luminous flux control member may include an accommodation groove accommodating the light source, and the incident surface may include an inner surface of the accommodation groove.

Preferably, but not necessarily, a ratio between a radius and thickness of the luminous flux control member may be 0.8:1~1:0.8.

Preferably, but not necessarily, a distance from the optical axis of the light source to an area where the rear surface and the first refractive surface join may be 0.5 times~0.9 times of the radius of the luminous flux control member.

Preferably, but not necessarily, the luminous flux control member may be directly formed on the driving substrate, or is directly formed on the light source.

In still another general aspect of the present invention, there is provided a method for manufacturing a light emitting device, the method comprising: providing, on an upper surface, a driving substrate mounted with a light source; providing a mold including a forming mold corresponding to the light source; and directly forming, inside the forming groove, a luminous flux control member on the driving substrate and the light source, wherein an inlet of the forming groove is arranged opposite to the light source, and a diameter of the inlet of the forming groove is smaller than a minor diameter of the forming groove.

Preferably, but not necessarily, the method may further comprise: arranging a resin composition inside the forming groove; and curing the resin composition while the resin composition is brought into direct contact with the light source and the driving substrate.

Advantageous Effects

The luminous flux control member according to the exemplary embodiments of the present invention includes a first refractive surface where a distance from a central axis is gradually increased as the first refractive surface recedes from a rear surface. The first refractive surface may be formed with an under-cut structure relative to a driving substrate, whereby light from a light source can be effectively emitted from the first refractive surface to a lateral direction or an upper lateral direction. Thus, the luminous flux control member and a display device having the same according to the exemplary embodiments of the present invention can possess an enhanced brightness uniformity and brightness.

DESCRIPTION OF DRAWINGS

The teachings of the present invention can be readily understood by considering the following Detailed Description in conjunction with the accompanying drawings, in which.

BEST MODE

In the drawings, it will be understood that when a panel (a sheet, a member, a guide or a unit) is referred to as being 'on' or 'under' another panel (another sheet, another member, another guide or another unit), it can be directly on or under the other panel (sheet, member, guide or unit), or intervening panels (sheets, members, guides or units) may also be present. In the drawings, the dimensions, such as sizes or thicknesses, of layers or films are exaggerated, omitted, or schematically shown for clarity of illustration. Accordingly, the sizes of the devices in the drawings do not thoroughly reflect real sizes of devices. Furthermore, the term of 'surface' and 'plane' may be interchangeably used.

Figure 1:
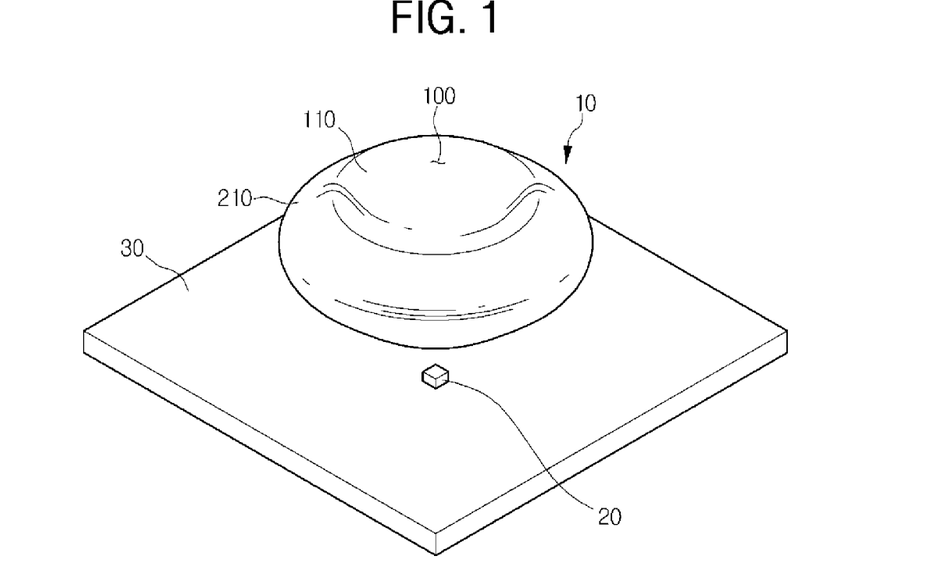
FIG. 1 is an exploded perspective view illustrating a light emitting device according to an exemplary embodiment of the present invention.
Figure 2:
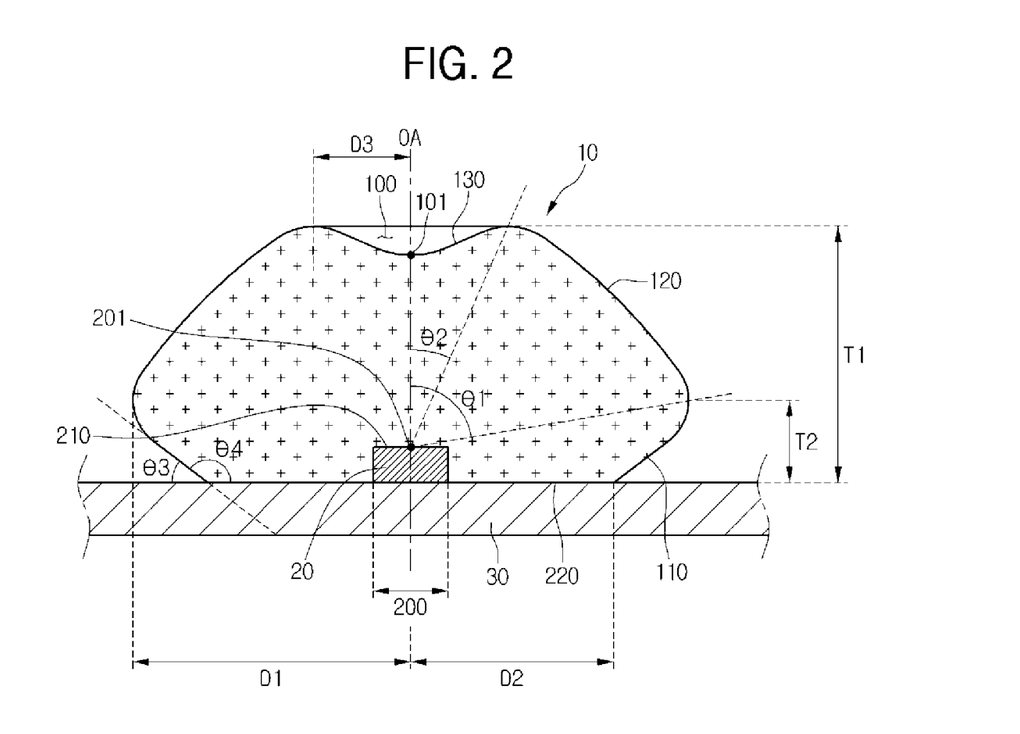
FIG. 2 is a cross-sectional view illustrating one cross-section of a light emitting device according to an exemplary embodiment of the present invention.
Figure 3:
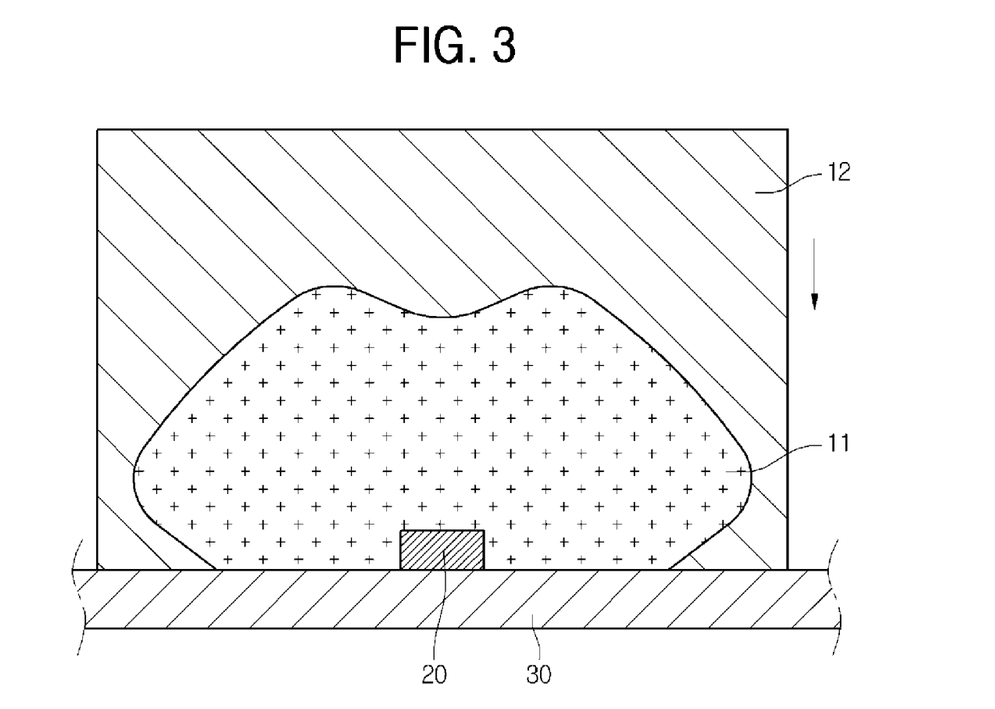
FIGS. 3 and 4 are schematic views illustrating a process of forming a luminous flux control member of FIG. 4.
Figure 4:
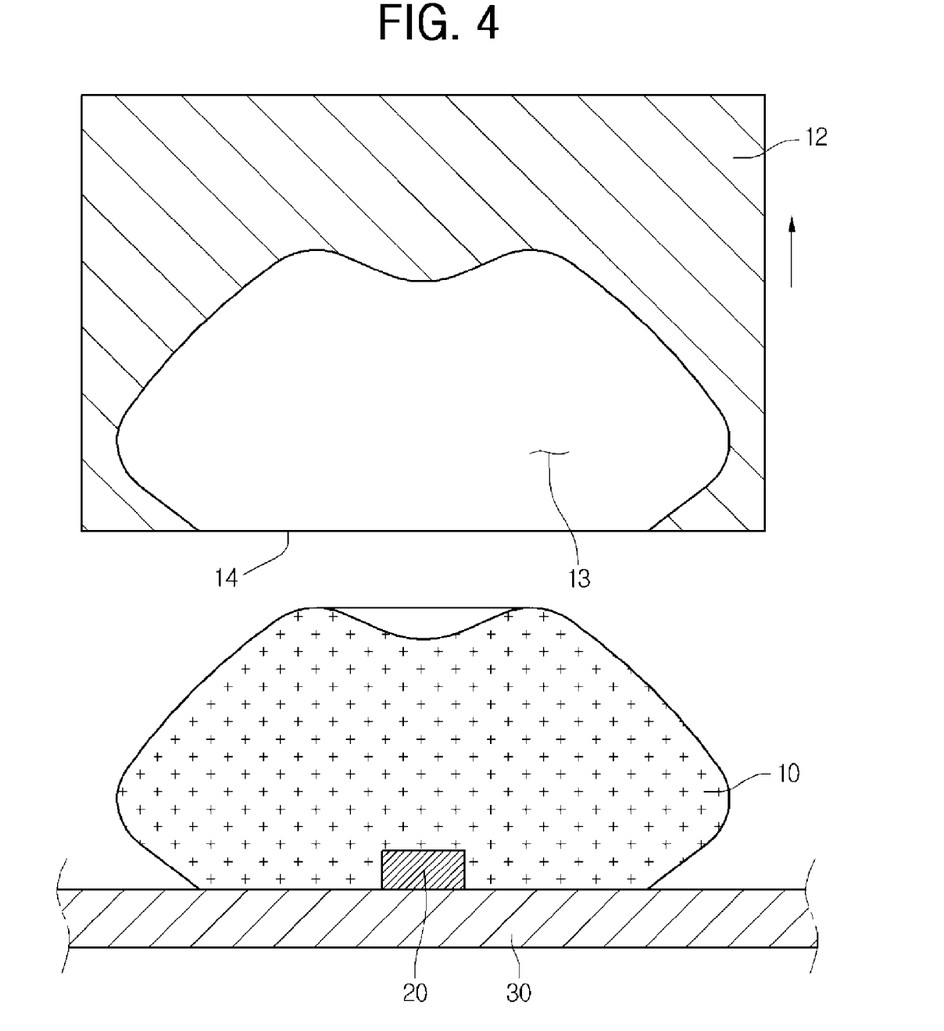

FIG. 1 is an exploded perspective view illustrating a light emitting device according to an exemplary embodiment of the present invention, FIG. 2 is a cross-sectional view illustrating one cross-section of a light emitting device according to an exemplary embodiment of the present invention, and FIGS. 3 and 4 are schematic views illustrating a process of forming a luminous flux control member of FIG. 4.

Referring to FIGS. 1 to 4, a light emitting device according to an exemplary embodiment of the present invention includes a luminous flux control member (10), a light source, e.g., a light emitting diode (20) and a driving substrate (30).

The luminous flux control member (10) is arranged on the driving substrate (30). The luminous flux control member (10) covers the light emitting diode (20). The luminous flux control member (10) can partially or totally accommodate the light emitting diode (20). The luminous flux control member (10) is incident with light emitted from the light emitting diode (20). The luminous flux control member (10) includes an incident surface (210), refractive surfaces (110, 120, 130) and a rear surface (220).

The incident surface (210) is a plane incident with light from the light emitting diode (20). The incident surface (210) is a plane opposite to the light source. The incident surface (210) may be directly brought into contact with the light source. To be more specific, the incident surface (210) may be a plane directly and tightly contacting the light source. Particularly, the luminous flux control member (10) may be formed with a concave unit (200).

The concave unit (200) corresponds to the light emitting diode (20). Furthermore, the concave unit (200) is arranged opposite to a depression (recess) unit (100). The concave unit (200) is formed at a bottom surface of the luminous flux control member (10). That is, the concave unit (200) is formed underneath the luminous flux control member (10).

The concave unit (200) is arranged with the light emitting diode (20). To be more specific, a part or a total of the light emitting diode (20) is arranged inside the concave unit (200). That is, a part or a total of the light emitting diode (20) is arranged inside the luminous flux control member (10).

At this time, the light emitted from the light emitting diode (20) may be incident through an inner surface of the concave unit (200). As a result, the inner surface of the concave unit (200) may be the incident surface (210) on which the light is incident. That is, most of the light may be incident on the luminous flux control member (10) through the inner surface of the concave unit (200). Alternatively, the luminous flux control member (10) may not be formed with the concave unit (200). At this time, the light emitting diode (20) may be arranged at the flat rear surface (220) of the luminous flux control member (10). At this time, a part of the rear surface (220) may be the incident surface (210).

Furthermore, the luminous flux control member (10) is formed with the depression unit (100). The depression unit (100) is formed at an upper surface of the luminous flux control member (10). The depression unit (100) corresponds to the light emitting diode (20). Furthermore, the depression unit (100) is depressed toward the light emitting diode (20). To be more specific, the depression unit (100) caves in toward the light emitting diode (20). The depression unit (100) is formed at a center of the luminous flux control member (10).

A center (101) of an inner surface of the depression unit (100) is arranged on an OA (Optical Axis) of the light emitting diode (20). That is, the OA of the light emitting diode (20) passes the center (101) of an inner surface of the depression unit (100). Furthermore, the depression unit (100) may have an axially symmetrical structure about the OA of the light emitting diode (20).

A center (201) of an inner surface of the concave unit (200) may be arranged on an OA (Optical Axis) of the light emitting diode (20). That is, the OA of the light emitting diode (20) may pass the center (101) of an inner surface (110) of the depression unit (100) and the center (201) of an inner surface of the concave unit (200).

The refractive surfaces (110, 120, 130) emit the light from the incident surface (210). Furthermore, the refractive surfaces (110, 120, 130) refract the light incident to the luminous flux control member (10). Each of the refractive surfaces (110, 120, 130) may be formed with a curved surface. The refractive surfaces (110, 120, 130) include a first refractive surface (110), a second refractive surface (120) and a recess surface (130).

The first refractive surface (110) is extended to the rear surface (220). The first refractive surface (110) may be bent from the rear surface (220) to be extended to a lateral direction. Furthermore, the first refractive surface (110) may be extended from an upper surface of the driving substrate (30) to an upper lateral direction.

That is, the first refractive surface (110) is extended from the rear surface (220) to the second refractive surface (120). The rear surface (220) faces the driving substrate (30). The rear surface (220) is extended from an inner surface of the concave unit (200) to a direction distancing from the OA of the light emitting diode (20).

The first refractive surface (110) may be a curved surface. To be more specific, the first refractive surface (110) may be spherical or aspheric. The first refractive surface (110) may emit light of the light emitting diode (20). Furthermore, the first refractive surface (110) may refract the light reflected from the recess surface (130). The first refractive surface (110) is extended from the rear surface (220) to an upper lateral direction.

That is, a distance from the OA of the light emitting diode (20) to the first refractive surface (110) may gradually increase as the first refractive surface (110) is distanced from the rear surface (220). A distance from the OA of the light emitting diode (20) to the first refractive surface (110) may gradually increase as the first refractive surface (110) is distanced from the driving substrate (30). That is, the first refractive surface (110) may have an under-cut structure based on an upper surface of the driving substrate (30).

The second refractive surface (120) is extended from an outside of the depression unit (100) to a lateral bottom direction. Furthermore, the second refractive surface (120) is curved from the first refractive surface (110) to be extended to an outside of the recess surface (130). At this time, a distance between the second refractive surface (120) and the OA of the light emitting diode (20) may gradually decrease as the second refractive surface (120) is distanced from the rear surface (220). That is, the second refractive surface (120) may come closer to the OA of the light emitting diode (20) as the second refractive surface (120) is distanced from the first refractive surface (110). The second refractive surface (120) may be spherical or aspheric. The second refractive surface (120) may refract the light reflected from the recess surface (130). To be more specific, the second refractive surface (120) may refract the light reflected from the recess surface (130) to any one direction of a lateral direction, a bottom lateral direction and an upper lateral direction.

The second refractive surface (120) may encompass a surrounding of the OA of the light emitting diode (20). Furthermore, the second refractive surface (120) may encompass a surrounding of the recess surface (130).

The recess surface (130) is an inner surface of the depression unit (100). The recess surface (130) may reflect the light from the light emitting diode (20) to any one direction of a lateral direction, a bottom lateral direction and an upper lateral direction. The recess surface (130) is extended from the OA of the light emitting diode (20).

To be more specific, the recess surface (130) is extended to a direction distancing from the OA of the light emitting diode (20). At this time, the direction distancing from the OA of the light emitting diode (20) means a direction crossing with the OA of the light emitting diode (20) or a direction inclining from the OA of the light emitting diode (20). To be more specific, the recess surface (130) is extended from the OA of the light emitting diode (20) to an upper lateral direction. The recess surface (130) is extended from the OA of the light emitting diode (20). At this time, the term of "OA (Optical Axis)" is a progressing direction of light at a center of 3-D luminous flux from a point light source.

Furthermore, the OA of the light emitting diode (20) may pass a center (201) of the incident surface (210) and a center (101) of the refractive surfaces (110, 120, 130). That is, the OA of the light emitting diode (20) may be substantially same as an OA of the luminous flux control member (10).

That is, the OA of the light emitting diode (20) may substantially match to a central axis of the luminous flux control member (10). At this time, the central axis may be a straight line that passes the center (201) of the incident surface (210) and the center (101) of the refractive surfaces (110, 120, 130).

A distance between the recess surface (130) and the OA of the light emitting diode (20) may gradually increase as being distanced from the light emitting diode (20). To be more specific, the distance between the recess surface (130) and the OA of the light emitting diode (20) may proportionally increase as being distanced from the light emitting diode (20).

The recess surface (130) may reflect the light emitted from the light emitting diode (20).

To be more specific, the recess surface (130) may totally reflect the light emitted from the light emitting diode (20). As a result, the recess surface (130) can prevent a hot spot from being generated by an excessive concentration of light to a center portion of the luminous flux control member (10). Furthermore, the recess surface (130) can reflect the light of the light emitting diode (20) to the second refractive surface (120) or the first refractive surface (110).

At this time, the curvature (or curve) means a shape of being gradually curved or bent. By way of non-limiting example, in a case two surfaces are bent by forming a curved surface having a radius of curvature greater than approximately 0.1 mm, it can be said that the two surfaces are curved. At this time, an inflection point, point of inflection, flex, or inflection (inflexion) is a point on a curve at which the curvature or concavity changes sign from plus to minus or from minus to plus. The curve changes from being concave upwards (positive curvature) to concave downwards (negative curvature), or vice versa. By way of non-limiting example, a convex curvature bends to change to a concave curvature, the convex curvature or the concave curvature may be said to have been inflected.

The rear surface (220) is extended from the incident surface (210). The rear surface (220) faces an upper surface of the driving substrate (30). The rear surface (220) may be brought into direct contact with the upper surface of the driving substrate (30). The rear surface (220) may directly face the upper surface of the driving substrate (30).

The rear surface (220) may be a plane. Furthermore, the rear surface (220) may encompass a surrounding of the incident surface (210). That is, the rear surface (220) may be extended along a surrounding of the light emitting diode (20).

The second refractive surface (120) and the first refractive surface (110) are formed at a lateral direction of the luminous flux control member (10).

The luminous flux control member (10) is transparent. A refractive index of the luminous flux control member (10) may be approximately 1.4 to approximately 1.5. The luminous flux control member (10) may be formed with a transparent resin. The luminous flux control member (10) may include a thermoplastic resin. To be more specific, the luminous flux control member (10) may include a silicon resin. An example of material used for the luminous flux control member (10) may be PDMS (Polydimethylsiloxane). The luminous flux control member (10) may have a high elasticity. A young's modulus of the luminous flux control member (10) may be approximately 100 kPa~approximately 1,000 kPa.

A ratio of radius (D1) of the luminous flux control member (10) and a thickness (T1) of the luminous flux control member (10) is approximately 0.8:1 approximately 1:0.8. Furthermore, a distance (D2) from the OA of the light emitting diode (20) to an area where the rear surface (220) and the first refractive surface (110) meet may be approximately 0.5 times~approximately 0.9 times the entire radius (D1). To be more specific, a distance (D2) from the OA of the light emitting diode (20) to an area where the rear surface (220) and the first refractive surface (110) meet may be approximately 0.7 times~approximately 0.9 times the entire radius (D1).

Furthermore, a height (T2) from an upper surface of the driving substrate (30) to an area where the first and second refractive surfaces (110, 120) meet may be approximately 0.1 times~approximately 0.5 times the entire thickness (T1). To be more specific, a height (T2) from an upper surface of the driving substrate (30) to an area where the first and second refractive surfaces (110, 120) meet may be approximately 0.3 times~approximately 0.4 times the entire thickness (T1). Furthermore, a radius (D3) of the depression unit (10) may be approximately 0.1 times~approximately 0.5 times the entire radius (D1).

Furthermore, an angle ($\theta_1$) between the OA of the light emitting diode (20) and a first straight line may be approximately 30° to approximately 85°, in a case the first straight line is defined by a line extended from the center (201) of the incident surface (210) to an area where the first and second refractive surfaces (110, 120) join. To be more specific, the angle ($\theta_1$) between the OA of the light emitting diode (20) and a first straight line may be approximately 45° to approximately 70°.

Furthermore, a line extended from the center (201) of the incident surface (210) to an area where the first refractive surface (110) and the recess surface (130) join may be defined as a second straight line. An angle ($\theta_2$) between the OA of the light emitting diode (20) and the second straight line may be approximately 5° to approximately 25°.

Furthermore, an angle ($\theta_3$) between the first refractive surface (110) and the upper surface of the driving substrate (30) may be approximately 5° to approximately 70°. Furthermore, an angle ($\theta_4$) between the first refractive surface (110) and the rear surface (220) may be approximately 110° to approximately 175°.

The luminous flux control member (10) may be directly formed with the driving substrate (30). Furthermore, the luminous flux control member (10) may be directly formed with the light emitting diode (20). The luminous flux control member (10) may be directly brought into contacted with the driving substrate (30) and the light emitting diode (20). To be more specific, the luminous flux control member (10) may be directly and tightly attached to the driving substrate (30) and the light emitting diode (20).

The luminous flux control member (10) may be formed in the following manner.

Referring to FIG. 3, a resin composition (11) is arranged on the driving substrate (30) mounted with the light emitting diode (20). The resin composition may include a thermosetting resin, a thermoplastic resin, or a photo-polymeric resin.

Thereafter, a mold (12) is provided on the driving substrate (30). The mold (12) is so arranged as to encompass the light emitting diode (20). As a result, the resin composition (11) is introduced into a forming groove (13) of the mold (12). The forming groove (13) of the mold (12) may take a substantially same shape as that of the abovementioned luminous flux control member (10). That is, a minor diameter of the forming groove (13) may gradually increase toward a floor of an inlet (14) and may decrease. That is, the inlet (14) of the forming groove (13) may have a minor diameter smaller than an inside of the forming groove (13).

Referring to FIG. 4, the resin composition (11) inside the forming groove (13) may be cooled or cured by heat and/or light. As a result, the luminous flux control member (10) is formed inside the forming groove (13), whereby the luminous flux control member (10) may be directly formed with an upper surface of the driving substrate (30) and the light emitting diode (20). That is, the luminous flux control member (10) may be directly and tightly attached to and formed with the upper surface of the driving substrate (30) and the light emitting diode (20).

Thereafter, the mold (12) is removed from the luminous flux control member (10). At this time, because luminous flux control member (10) has enough elasticity, the mold (12) can be easily separated, even if the inlet (14) of the forming groove (13) is smaller than the inside of the forming groove (13). Alternatively, the mold (12) can be easily separated in a case the mold (12) has a high elasticity. By way of non-limiting example, the young's modulus of the luminous flux control member (10) and the mold (12) may be approximately 100 kPa~approximately 1,000 kPa.

As noted, the elasticity of the luminous flux control member (10) of the mold (12) can be adequately adjusted to allow the luminous flux control member (10) to be easily formed on the driving substrate (30). Particularly, the first refractive surface (110) has an undercut structure to allow the luminous flux control member (10) to be easily formed on the driving substrate (30). Alternatively, the luminous flux control member (10) may be attached to the driving substrate (30) using an adhesive.

The light emitting diode (20) generates light. The light emitting diode (20) may be a point light source. The light emitting diode (20) is electrically connected to the driving substrate (30). The light emitting diode (20) may be mounted on the driving substrate (30). As a result, the light emitting diode (20) receives an electrical signal from the driving substrate (30). That is, the light emitting diode (20) is driven by the driving substrate (30) to thereby generate the light.

The driving substrate (30) supports the light emitting diode (20) and the luminous flux control member (10). Furthermore, the driving substrate (30) is electrically connected to the light emitting diode (20). The driving substrate (30) may be a PCB (Printed Circuit Board). Furthermore, the driving substrate (30) may be rigid or flexible.

Although the present exemplary embodiment of the present invention has illustrated and explained one driving substrate (30) arranged by one light emitting diode (20) and one luminous flux control member (10), the present invention is not limited thereto. By way of non-limiting example, one driving substrate (30) may be arranged by a plurality of light emitting diodes (20). Furthermore, each of the light emitting diodes (20) may be correspondingly arranged by each of the luminous flux control members (10).

The light reflected by the recess surface (130) may be selectively refracted by the first and second refractive surfaces (110, 120). Particularly, the luminous flux control members (10) can refract the light at a desired angle based on a reflective angle of the recess surface (130).

Particularly, the first refractive surface (110) has an undercut structure, that is, a structure of distancing from the OA of the light emitting diode (20) as the first refractive surface (110) is distanced from the rear surface (220). As a result, the first refractive surface (110) can effectively refract the light directly incident from the incident surface (210) to a lateral direction or to an upper lateral direction. Furthermore, the first refractive surface (110) can also effectively reflect the light reflected by the recess surface (130) and the second refractive surface (120) to a lateral direction or to an upper lateral direction.

Thus, the luminous flux control member (10) can effectively diffuse the light emitted from the light emitting diode (20) to the lateral direction. As a result, the light emitting device according to an exemplary embodiment of the present invention can posses enhanced brightness uniformity and may be adequate to form a surface light source.

Figure 5:
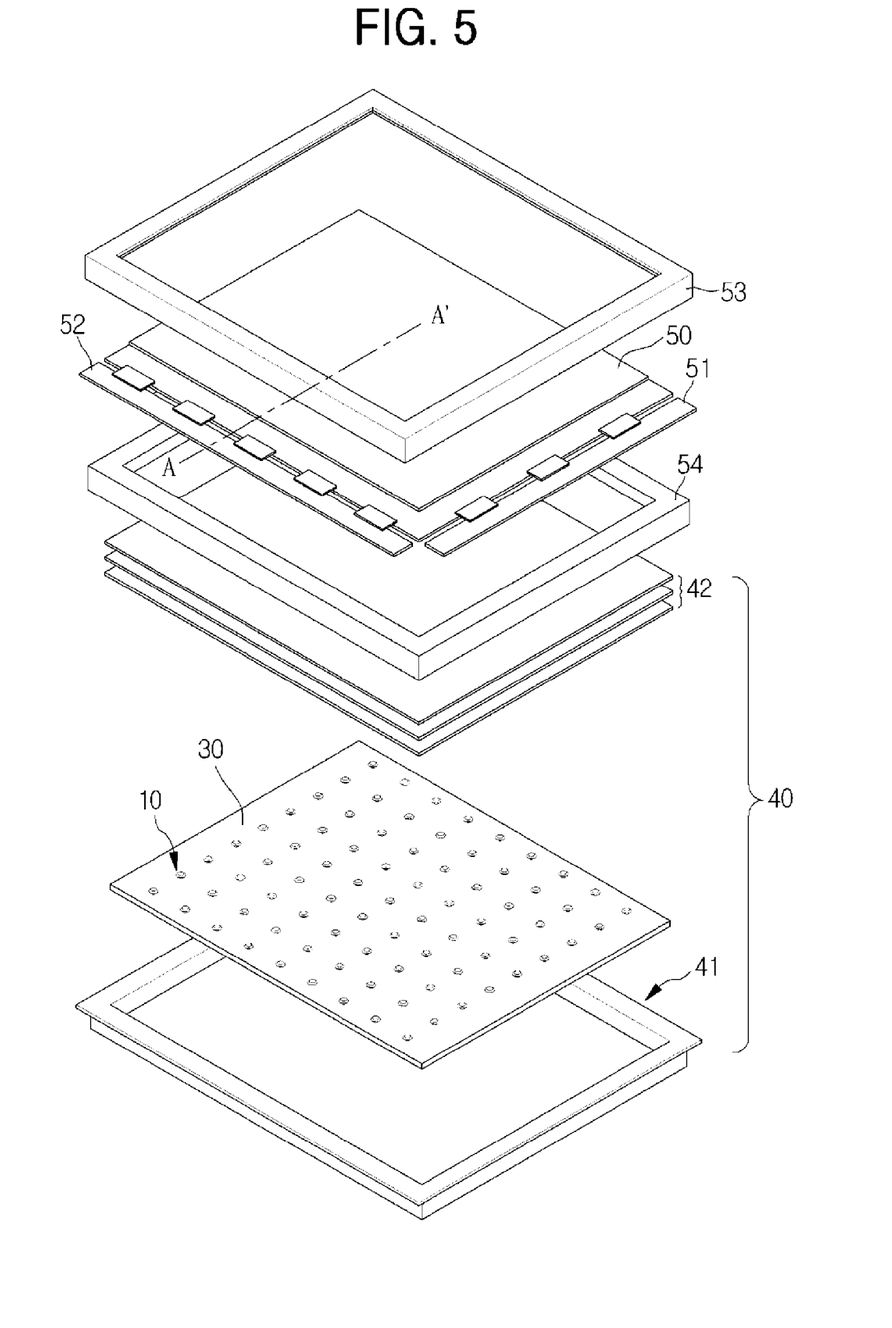
FIG. 5 is an exploded perspective view illustrating a liquid crystal display device according to an exemplary embodiment of the present invention.
Figure 6:
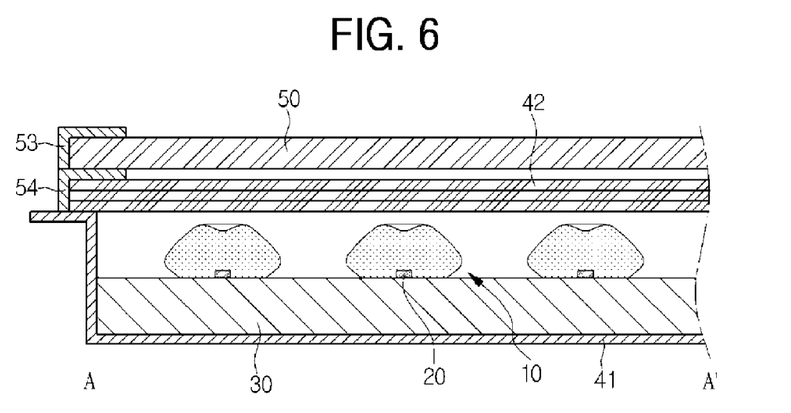
FIG. 6 is a cross-sectional view illustrating a cross-section taken along line A-A' of FIG. 5.

FIG. 5 is an exploded perspective view illustrating a liquid crystal display device according to an exemplary embodiment of the present invention, and FIG. 6 is a cross-sectional view illustrating a cross-section taken along line A-A' of FIG. 5.

In the present exemplary embodiment, the aforementioned light emitting device will be used as reference. That is, explanation and illustration of the light emitting device according to the previous exemplary embodiments will be substantially combined with those of the present exemplary embodiment.

Referring to FIGS. 5 and 6, a liquid crystal display device according to the present exemplary embodiment includes a liquid crystal display panel (50) and a backlight unit (40). The liquid crystal display panel (50) serves to display a picture data or an image.

Although not illustrated, the liquid crystal display panel (50) includes, for coherence to maintain a uniform gap by facing each other, a TFT (Thin Film Transistor) substrate, a C/F (Color Filter) substrate and a liquid crystal layer interposed between the TFT substrate and the C/F substrate. The TFT substrate is structurally configured such that a plurality of gate lines is formed, a plurality of data lines crossing the plurality of data lines is formed and TFTs are formed at a crossing area between the gate lines and the data lines.

The liquid crystal display panel (50) includes, at an edge thereof, a gate driving PCB (51) supplying a scan signal to the gate line, and a data driving PCB supplying a data signal to the data line (52). The gate and data driving PCBs (51, 52) are electrically connected to the liquid crystal display panel (50) using a COF (Chip On Film), where the COF may be replaced by a TCP (Tape Carrier Package).

Furthermore, the liquid crystal display device according to the present exemplary embodiment includes a panel guide (54) supporting the liquid crystal display panel (50) and a top case (53) encompassing an edge of the liquid crystal display panel (50) and coupled to the panel guide (54).

The backlight unit (40) is configured to be mounted on a large (20-inch or more) liquid crystal display device in a direct type method. The backlight unit (40) includes a bottom cover (41), a driving substrate (30), a plurality of light emitting diodes (20), a plurality of luminous flux control members (10) and optical sheets (42).

The bottom cover (41) takes a shape of an upper surface-opened box to accommodate the driving substrate (30). Furthermore, the bottom cover (41) functions to support the optical sheets (42) and the liquid crystal display panel (50). The bottom cover (41) may be formed using a metal and the like. By way of non-limiting example, the bottom cover (41) may be formed by bending or curving a metal plate. That is, the driving substrate (30) is accommodated at a space formed by the bending and curving the metal plate.

The driving substrate (30) is arranged inside the bottom cover (41). The driving substrate (30) may be a driving substrate (30). The driving substrate (30) is electrically connected to the light emitting diodes (20). That is, the light emitting diodes (20) may be mounted on the driving substrate (30). The driving substrate (30) takes a shape of a plate. The driving substrate (30) is electrically connected to the light emitting diodes (20) and supplies a driving signal to the light emitting diodes (20). The driving substrate (30) may be coated at an upper surface with a reflective layer for enhancing performance of the backlight unit (40). That is, the reflective layer can reflect the light emitted from the light emitting diodes (20) to an upward direction.

The light emitting diodes (20) generate light using an electrical signal applied through the driving substrate (30). That is, the light emitting diodes (20) are light sources. To be more specific, each of the light emitting diodes (20) is a point light source, and each of the light emitting diodes is gathered to form a surface light source, where the light emitting diodes (20) are a light emitting diode (20) package including light emitting diode (20) chips.

The light emitting diodes (20) are mounted on the driving substrate (30). The light emitting diodes (20) may be arranged on the driving substrate (30), each at a predetermined distance. The light emitting diodes (20) may emit white light. Alternatively, the light emitting diodes (20) may emit blue light, green light and red light on an even dividing manner.

The luminous flux control members (10) respectively cover the light emitting diodes (20). The light from the light emitting diodes (20) is incident on the luminous flux control members (10). The incident light now has a brightness uniformity enhanced by the luminous flux control members (10) and is emitted upwards. The configuration and characteristics of the luminous flux control members (10) may be substantially same as those of the previous exemplary embodiments.

The optical sheets (42) improve the characteristics of passing light. The optical sheets (42) may be polarizing sheets, prism sheets or diffusion sheets, for example.

As explained in the previous exemplary embodiments, the luminous flux control members (10) can effectively diffuse the light emitted from the light emitting diodes (20). As a result, the backlight unit (40) according to an exemplary embodiment of the present invention can emit light having the enhanced brightness uniformity to the liquid crystal panel. Thus, the liquid crystal display device according to the present exemplary embodiment can have the enhanced brightness uniformity and enhanced picture quality.

What has been described above in terms of characteristics, structures and effects includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications, and variations that fall within the scope of the appended claims.

While the present invention has been described with respect to the above exemplary embodiments, the present invention is not so limited and should be understood to be merely exemplary. Various modifications to the invention will be readily apparent to those skilled in the art, and the generic principles defined herein may be applied to other variations without departing from the spirit or scope of the invention. For example, each constituent element explained in detail in the above exemplary embodiments may be implemented in other various modifications.

MODE FOR INVENTION

Experimental Example

Figure 7:
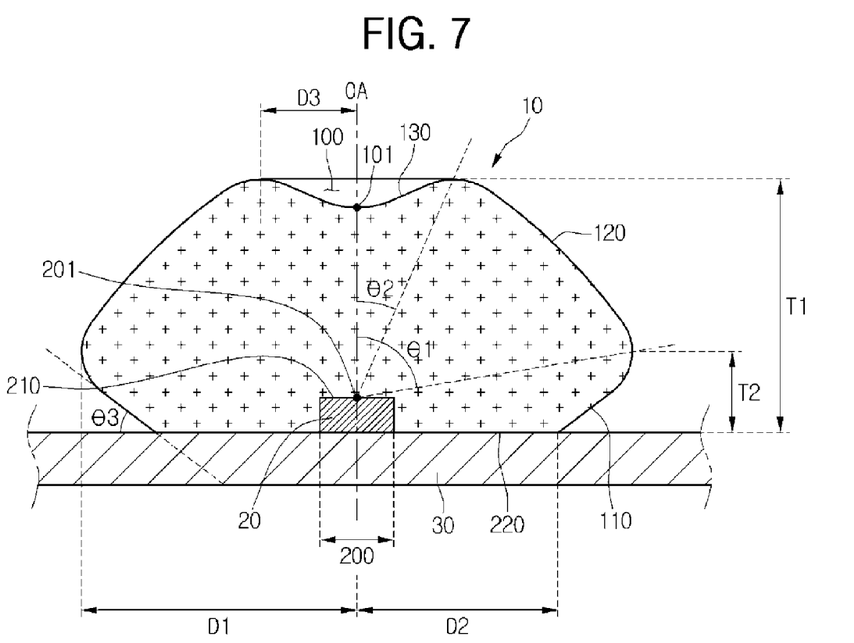
FIG. 7 is a cross-sectional view illustrating a luminous flux control member according to an experimental example.

As illustrated in FIG. 7, a luminous flux control member (10) is mounted. A radius (D1) of the luminous flux control member (10) and a thickness (T1) of the luminous flux control member (10) were approximately 8 mm and approximately 2 mm respectively. A distance (D2) from the OA of the light emitting diode (20) to an outside of the rear surface (220) was approximately 7 mm, and a distance (T2) from an upper surface of the driving substrate (30) to an area where the first and second refractive surfaces (110, 120) meet was approximately 0.7 mm.

Furthermore, an angle ($\theta_1$) between the OA of the light emitting diode (20) and a first straight line was approximately 60°, and an angle ($\theta_2$) between the OA of the light emitting diode (20) and a second straight line was approximately 45°. Furthermore, an angle ($\theta_3$) between the first refractive surface (110) and the upper surface of the driving substrate (30) was approximately 40°.

Figure 8:
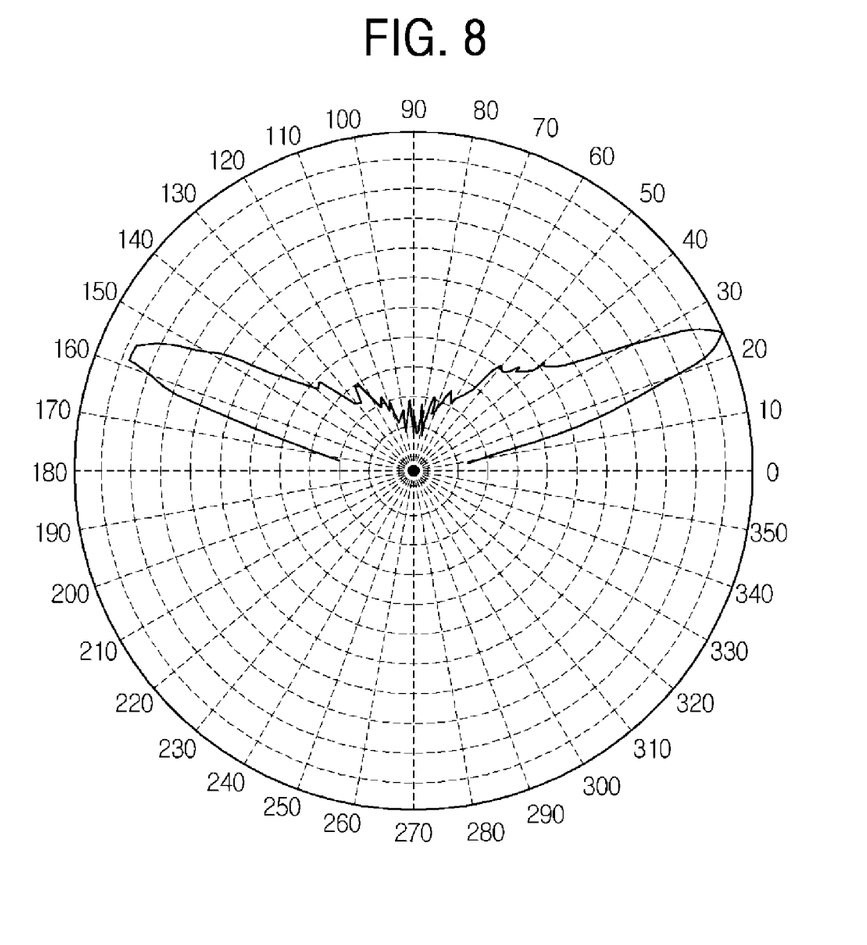
FIG. 8 is a schematic view illustrating a brightness distribution in the experimental example.

Brightness distribution of light emitted from the light emitting diode (20) to the luminous flux control member (10) was measured as shown in FIG. 8, where a thick line illustrates strength to an X axis direction, while a thin line illustrates strength to a Y axis direction. As shown in FIG. 8, it could be noted that the light from the light emitting diode (20) can be effectively diffused by the luminous flux control member (10).

INDUSTRIAL APPLICABILITY

The exemplary embodiments of the present invention have a first refractive surface whose distance from a central axis gradually increasing as being distanced from a rear surface, and light from a light source is effectively emitted from a first refractive surface to a lateral direction or an upper lateral direction, whereby a luminous flux control member and display device having the same capable of enhancing brightness uniformity and brightness can be provided.

The invention claimed is:

1. A member for controlling luminous flux comprising:
an incident surface where light is incident on;
a refractive surface where the light is emitted from the incident surface; and
a rear surface extended from the incident surface to the refractive surface, where a central axis is defined by an axis extended from a center of the incident surface to a center of the refractive surface, and
wherein the refractive surface includes a first refractive surface extended from the rear surface, where a distance from the central axis is gradually increased as the first refractive surface recedes from the rear surface, and a second refractive surface that is curved and extended from the first refractive surface, where a distance from the central axis is gradually decreased as the second refractive surface recedes from the rear surface,
wherein the refractive surface is formed with a recess surface opposite to the incident surface, and the second refractive surface is extended from the first refractive surface to an outside of the recess surface,
wherein the recess surface totally reflects the light emitted from a light emitting diode, and the light reflected by the recess surface is selectively refracted by the first and second refractive surfaces, and wherein the luminous flux control member is in direct contact with a driving substrate, and a shape of the luminous flux control member is arranged with a shape of light emitting diode.

2. The member of claim 1, wherein the recess surface reflects the light to any one direction of a lateral direction, an upper lateral direction and a bottom lateral direction.

3. The member of claim 2, wherein the second refractive surface refracts the light reflected from the recess surface to any one direction of a lateral direction, an upper lateral direction and a bottom lateral direction.

4. The member of claim 1, wherein a second straight line is defined by a line extended from a center of the incident surface to an area where the second refractive surface and the recess surface join, and an angle between the central axis and the second straight line is 5~25.

5. The member of claim 1, wherein a first straight line is defined by a line extended from a center of the incident surface to an area where the first refractive surface and the second refractive surface join, and an angle between the central axis and the first straight line is 30~85.

6. The member of claim 1, wherein an angle formed by the first refractive surface and the rear surface is 110~175.

7. The member of claim 1, wherein the luminous flux control member includes a silicon resin.

8. A display device comprising:
a driving substrate;
a light source connected to the driving substrate;
a luminous flux control member incident with light from the light source; and
a display panel incident with the light from the luminous flux control member,
wherein the luminous flux control member includes an incident surface where light is incident on from the light source, and a refractive surface where the light is emitted from the incident surface,
wherein the refractive surface includes a first refractive surface where a distance from an axis of the light source is gradually increased as the first refractive surface recedes from a driving substrate, and a second refractive surface that is curved and extended from the first refractive surface, where a distance from the central axis of the luminous flux control member is gradually decreased as the second refractive surface recedes from a rear surface of the luminous flux control member,
wherein the refractive surface is formed with a recess surface opposite to the incident surface, and the second refractive surface is extended from the first refractive surface to an outside of the recess surface,
wherein the recess surface totally reflect the light emitted from the light source, and the light reflected by the recess surface is selectively refracted by the first and second refractive surfaces, and wherein the luminous flux control member is in direct contact with the driving substrate, and a shape of the luminous flux control member is arranged with a shape of the light emitting diode.

9. The display device of claim 8, wherein the luminous flux control member further includes the rear surface extended from the incident surface and being opposite to the driving substrate, wherein the first refractive surface is extended from the rear surface.

10. The display device of claim 9, wherein a distance from the optical axis of the light source to an area where the rear surface and the first refractive surface join is 0.5 times~0.9 times of the radius of the luminous flux control member.

11. The display device of claim 9, wherein the first refractive surface is such that a distance from an optical axis of the light source is gradually increased as the first refractive surface recedes from the rear surface.

12. The display device of claim 8, wherein the luminous flux control member includes an accommodation groove accommodating the light source, and the incident surface includes an inner surface of the accommodation groove.

13. The display device of claim 8, wherein a ratio between a radius and thickness of the luminous flux control member is 0.8:1~1:0.8.

14. The display device of claim 8, wherein the luminous flux control member is directly formed on the driving substrate, or is directly formed on the light source.

15. A method for manufacturing a light emitting device comprising:
providing, on an upper surface, a driving substrate mounted with a light source;
providing a mold including a forming mold corresponding to the light source;
directly forming, inside the forming groove, a luminous flux control member on the driving substrate and the light source;
arranging a resin composition inside the forming groove; and
curing the resin composition while the resin composition is brought into direct contact with the light source and the driving substrate,
wherein an inlet of the forming groove is arranged opposite to the light source, and a diameter of the inlet of the forming groove is smaller than a minor diameter of the forming groove, and
wherein a recess surface of the luminous flux control member totally reflect a light emitted from the light source, and the light reflected by the recess surface of the luminous flux control member is selectively refracted by a first and second refractive surfaces of the luminous flux control member.

* * * * *